US008107226B2

(12) United States Patent
Souligne

(10) Patent No.: US 8,107,226 B2
(45) Date of Patent: Jan. 31, 2012

(54) TRANSFER SWITCH WITH EASILY REMOVABLE WEATHERPROOF DOOR AND HOOD

(75) Inventor: Andrew Paul Souligne, Alexandria, IN (US)

(73) Assignee: Connecticut Electric, Inc., Anderson, IN (US)

( * ) Notice: Subject to any disclaimer, the term of this patent is extended or adjusted under 35 U.S.C. 154(b) by 65 days.

(21) Appl. No.: 12/509,100

(22) Filed: Jul. 24, 2009

(65) Prior Publication Data

US 2011/0019365 A1    Jan. 27, 2011

(51) Int. Cl.
*H02B 1/04* (2006.01)
*H05K 5/03* (2006.01)
(52) U.S. Cl. .......................................... 361/643; 174/50
(58) Field of Classification Search .................. None
See application file for complete search history.

(56) References Cited

U.S. PATENT DOCUMENTS

| | | | | |
|---|---|---|---|---|
| 1,596,712 A * | 8/1926 | Borger | .......................... | 361/672 |
| 1,887,956 A * | 11/1932 | Rypinski | ....................... | 361/659 |
| 1,898,634 A * | 2/1933 | Lewis | ........................... | 361/663 |
| 2,656,948 A * | 10/1953 | McGee | .......................... | 220/3.8 |
| 3,361,938 A * | 1/1968 | Watson | ......................... | 361/647 |
| 3,585,456 A * | 6/1971 | Phillips, Jr. | ................... | 361/663 |
| 3,895,179 A * | 7/1975 | Wyatt | .............................. | 174/50 |
| 5,272,279 A * | 12/1993 | Filshie | ........................... | 174/50 |
| 5,521,973 A * | 5/1996 | Peng | ............................. | 379/329 |
| 6,290,375 B1 * | 9/2001 | LeVasseur | .................... | 362/368 |
| 2010/0128418 A1 * | 5/2010 | Pruehs et al. | ................. | 361/664 |

* cited by examiner

*Primary Examiner* — Gregory Thompson
(74) *Attorney, Agent, or Firm* — Carstens & Cahoon, LLP; Vincent J. Allen

(57) ABSTRACT

Disclosed herein is a transfer switch having an easily removable weatherproof door and hood, allowing a user to optionally mount the switch on the interior or exterior of a structure. The weatherproof door and hood work together to protect the transfer switch from exposure to rain and other unwanted substances that would otherwise harm the components within the switch if mounted on the exterior of a structure. Removable fasteners corresponding to pre-drilled holes in the main compartment of the switch are used to secure the door and hood to the main compartment of the switch, permitting a user to easily remove them if the switch is to be mounted on the interior of a structure.

19 Claims, 2 Drawing Sheets

TRANSFER SWITCH WITH EASILY REMOVABLE WEATHERPROOF DOOR AND HOOD

BACKGROUND OF THE INVENTION

1. Field of the Invention

The invention relates generally to enclosures for electrical hardware, and more specifically, to a transfer switch having an easily removable weatherproof door and hood so as to permit both indoor and outdoor mounting.

2. Description of the Related Art

It is well known that homes and other structures connected to public utility power sources sometimes lose power due to service disruptions. Such service disruptions are often the result of inclement weather or load shedding by the utility company (rolling blackouts). Service disruptions are usually inconvenient to residents and occasionally can have fatal consequences. As a result, many homeowners utilize fuel powered generators to supply their home's power needs during service interruptions.

A transfer switch connected to both a home's main load center and a generator is used to switch between utility based power and generator power. When service from utility based power is disrupted, a transfer switch acts to transfer the main load center from connectivity with utility based power to generator based power. Transfer switches may operate automatically or manually.

Local building codes in a minority of jurisdictions require that transfer switches be located outside of a home's interior. As transfer switches contain numerous components that must remain dry and free from contact with other unwanted substances, transfer switches installed on the outside of a home's interior must be housed in an enclosure that will protect the switch from exposure to the elements. As only a minority of homeowners are required to install transfer switches on the outside of the home's interior, most manufacturers of transfer switches do not offer for sale a weatherproof transfer switch. However, at an additional cost to the homeowner, prior art accessory kits containing additional enclosure structures for transfer switches are available for purchase. Once purchased, the homeowner may install the enclosure structures onto the transfer switch.

One disadvantage seen in the aforementioned accessory enclosure kits found in the prior art is that the user of such kits must separately purchase the kit on special order from the manufacturer, often at great expense. Another disadvantage of such kits is that the user must install the kits onto the transfer switch, often requiring the user to physically alter the switch housing to accommodate the enclosure structures of the kit.

BRIEF SUMMARY OF THE INVENTION

Accordingly, there is provided herein, a transfer switch having an easily removable door and hood that, in its preferred embodiments, is capable of protecting the switch from exposure to rain and other unwanted elements to which it would be susceptible when mounted outside a home's interior.

In one aspect of the invention, a hinged door is removably secured to the front side of a main compartment of a transfer switch. The door acts to prevent water and unwanted substances from contacting sensitive components of the switch. The door may be easily removed by the user if it is necessary to mount the transfer switch within the interior of a home or other structure. In particular, the door, which is secured to the main compartment via screws, may be quickly and easily removed by the user by simply using a screwdriver.

In another aspect of the invention, a hood is removably secured to the top side of the main compartment of the switch. The hood acts to prevent water and unwanted substances from contacting sensitive components of the switch. The hood may be easily removed by the user if it is necessary to mount the transfer switch within the interior of a home or other structure. In particular, the hood, which is secured to the main compartment via screws, may be quickly and easily removed by the user by simply using a screwdriver.

In yet another aspect of the invention, the aforementioned transfer switch, door, and hood may be sold to consumers pre-installed. As such, it is not necessary for a homeowner to separately purchase an accessory enclosure kit and to install said kit. The foregoing advantage, not seen in prior art switches, will result in cost savings to homeowners.

Moreover, the costs involved in manufacturing and assembling the main compartment and enclosure structures (door and hood) together are less than if the main compartment and the enclosure structures are manufactured separately and the enclosure structures are sold as an aftermarket kit to be assembled by a homeowner. Further, costs associated with maintaining inventory of the main compartments and enclosure structures will be reduced if the main compartments and enclosure structures are assembled together and stored together.

Accordingly, the present invention overcomes the disadvantages found in the prior art mentioned above.

BRIEF DESCRIPTION OF THE SEVERAL VIEWS OF THE DRAWINGS

A more complete understanding of the transfer switch with a easily removable door and hood of the present invention may be had by reference to the following detailed description when taken in conjunction with the accompanying drawings, wherein.

Figure 1:
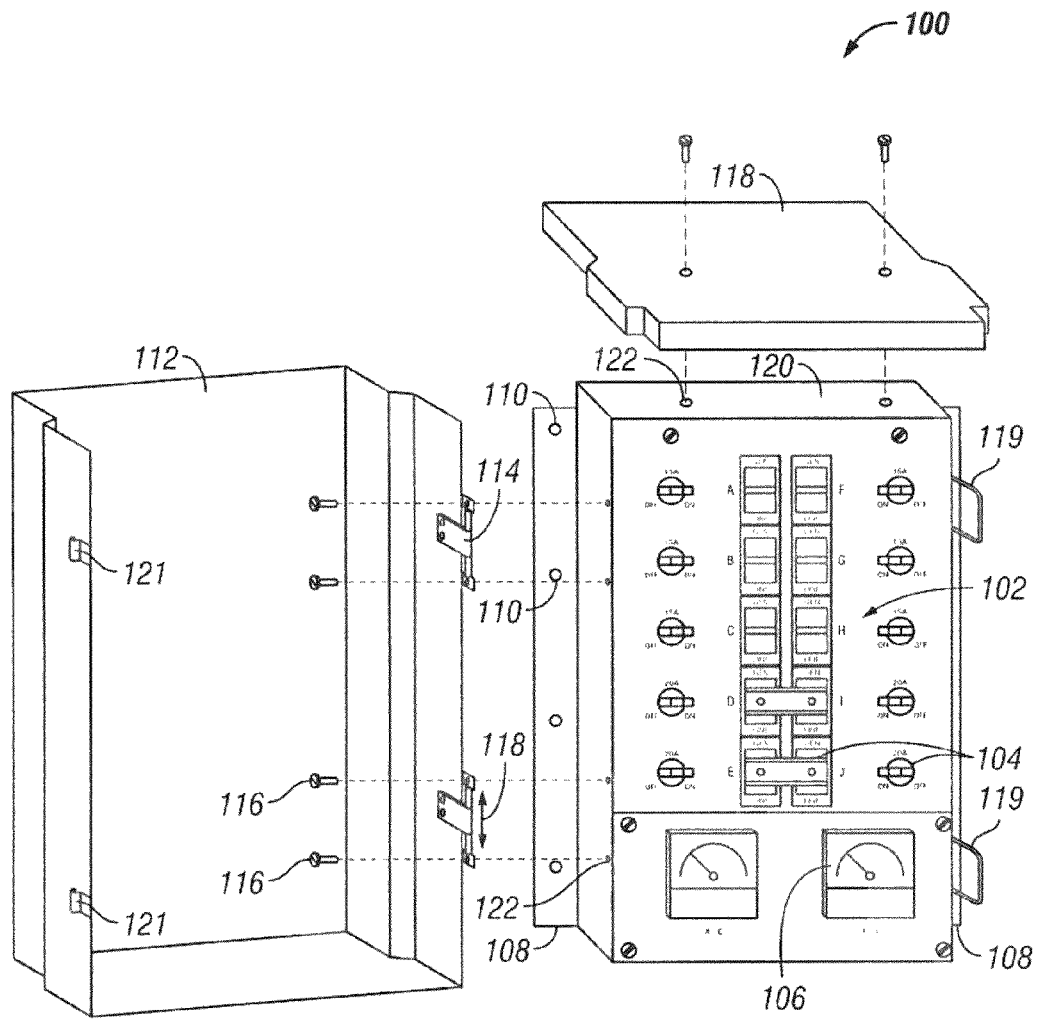
FIG. 1 is an exploded view of a preferred embodiment of the transfer switch of the present invention having an easily removable door and hood.

Where used in the various figures of the drawings, the same numerals designate the same or similar parts. Furthermore, when the terms "top," "bottom," "front," "first," "second," "upper," "lower," "height," "outer," "inner," "width," "length," "end," "side," "horizontal," "vertical," and similar terms are used herein, it should be understood that these terms have reference only to the structure shown in the drawing and are utilized only to facilitate describing the invention in a typical installation.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific width, length, and similar requirements will likewise be within the skill of the art after the following teachings of the present invention have been read and understood.

Preferred embodiments of the transfer switch according to the present invention will now be described in detail with reference to the accompanying drawings.

DETAILED DESCRIPTION OF THE INVENTION

Ordinarily, a home or other structure is connected to a utility based electric power source. However, it is well known that service disruptions of utility based power sometimes occur as a result of inclement weather or due to other factors beyond the control of the utility subscriber. Many homeowners have taken the proactive step of purchasing a fuel powered electrical generator so that they will have access to an alternative power source in the event of an interruption of service of the utility based power.

A transfer switch is an electrical hardware device that is connected to a home's main load center, the utility based power source, and a generator. When engaged, either manually or automatically, the transfer switch transfers the electrical connection to the home's main load center, from the utility based power source, to the generator. As mentioned previously, local building codes in a minority of jurisdictions require that transfer switches be mounted outside a home's interior. Most manufacturers do not sell transfer switches that have enclosures that would protect the sensitive electrical components within the switch from rain and contact with other potentially damaging substances. Instead, some manufacturers of transfer switches offer for sale accessory kits having enclosure structures that the homeowner must install on an existing transfer switch. Such accessory kits are often expensive as they must be specially ordered from the manufacturer, and can be difficult to install onto a transfer switch because the switch must be physically altered to mount the enclosure structures.

Referring to FIG. 1, an exploded view of the presently preferred embodiment of the transfer switch having an easily removable weatherproof door and hood is shown. The transfer switch 100 has a main compartment having a front side 102 on which a plurality of actuators 104 such as knobs and buttons are located for easy access by homeowner or other operator. Further, gauges 106 such as watt meters are also located on the front side 102 of the transfer switch 100. The aforementioned actuators, gauges, and the electrical components within the transfer switch are sensitive to exposure to rain and other elements that may be present outside of a home's interior. Flanges 108 having pre-drilled holes 110 for receiving fasteners such as screws or bolts (not shown), are formed on the rear side of the main compartment. A homeowner may use fasteners to mount the transfer switch to a wall or suitable structure.

The transfer switch 100 of a preferred embodiment of the invention also includes a weatherproof door 112 that is configured to be removably secured to a side of the main compartment. The door 112 is secured to a side of the main compartment by means of one or more hinges 114 held in place by fasteners 116. The fasteners utilized in the preferred embodiment are screws 116. However, it should be understood by those skilled in the art that any other fastening means for removably securing the door to the main compartment are contemplated. The hinges 114 of the presently preferred embodiment are configured such that when secured to the side of the main compartment, the door 112 may freely slide in an up and down direction 118 on the hinge 114. As described further below, the foregoing feature permits the door 112 to be closed in a manner such that rain cannot easily contact the components found inside the main compartment. One or more latches 119 formed on the side of the main compartment opposite the hinges 114, are configured to engage bent protrusions 121 formed on the door 112. The latches 119 secure the door 112 in place when closed, preventing the door 112 from opening or sliding down the hinges 114. The door of the presently preferred embodiment of the transfer switch is configured to naturally rest at the lowest position of the hinge when the door 112 is open.

The transfer switch 100 of a preferred embodiment of the invention also includes a weatherproof hood 118 that is configured to be removably secured to the top side 120 of the main compartment. Screws or other means for removably fastening the hood to the top side 120 of the main compartment allow the hood 118 to be easily removed by a homeowner or other user. Pre-drilled holes 122 for receiving the screws for securing the door 112 and the hood 118 are present on the side and top of the main compartment, respectively. The hood is positioned on the top side 120 of the main compartment such that a portion thereof extends beyond the front side 102 of said main compartment.

Figures 2, 3:
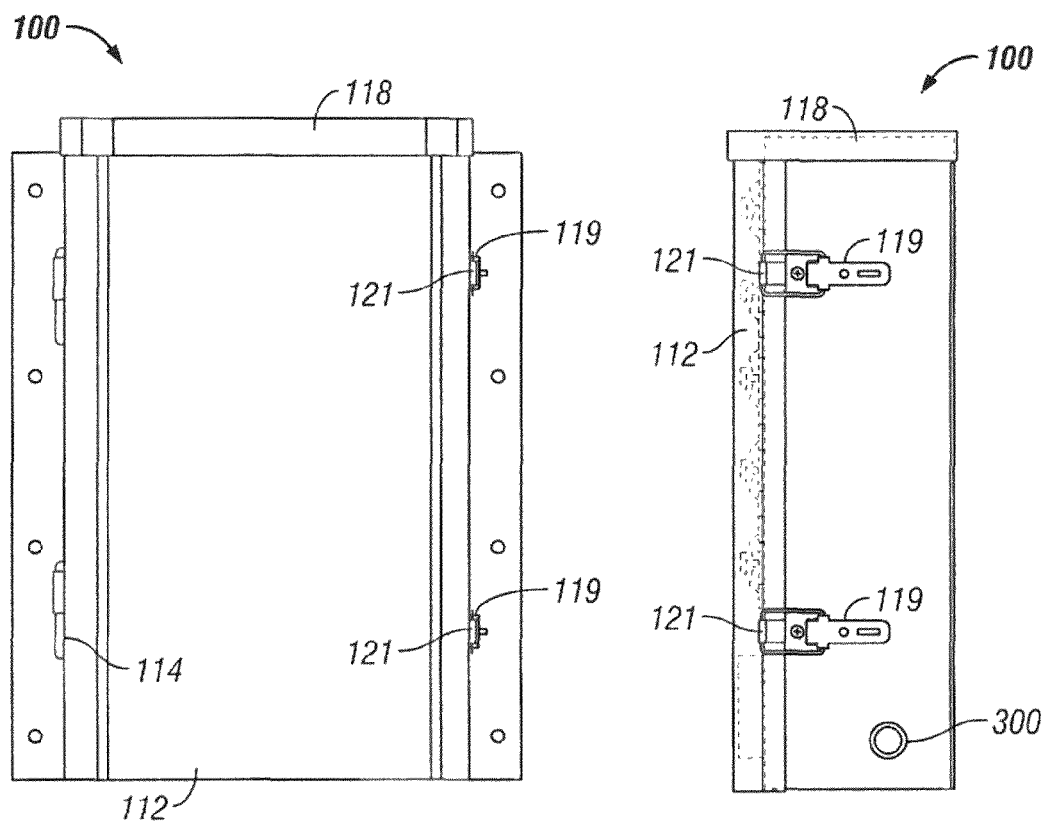
FIG. 2 is a front view of a preferred embodiment of the transfer switch having an easily removable door and hood.
FIG. 3 is a side view of a preferred embodiment of the transfer switch having an easily removable door and hood.

Referring now to FIG. 2, a front view of a preferred embodiment of the transfer switch 100 of the present invention is shown. The door 112 has been rotated about the hinges 114 so as to be closed around the front side 102 of the main compartment. As mentioned previously, the door of a preferred embodiment of the transfer switch is configured to rest at the lowest position of the hinge 114 when not closed. To secure the door 112 in the closed position, the homeowner must rotate the door 112 into the closed position, and then slide the door upwards along the hinges such that the top edge of the door slides under the portion of the hood 118 that extends beyond the front side of the main compartment. By sliding the top edge of the door 112 under the extended portion of the hood 118, the door 112 is capable of being closed in a manner such that water falling from above the switch 100 will not easily penetrate into the main compartment.

Referring now to FIG. 3, a side view of a preferred embodiment of the transfer switch 100 of the present invention is shown. The door 112 is in the closed position and the top edge of the door 112 is positioned under the hood 118 such that rain or other unwanted elements will not contact the components within the transfer switch 100. One or more openings 300 may be formed on the sides of the main compartment to allow for placement of wiring connecting to the transfer switch.

Figure 4:
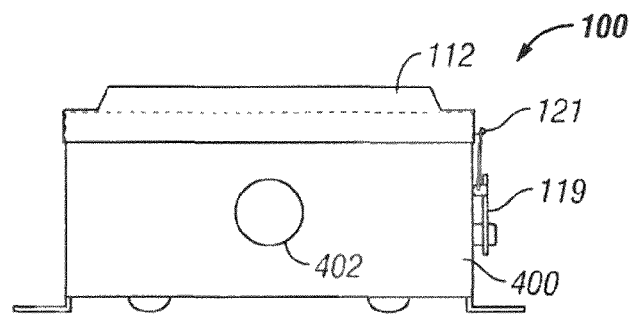
FIG. 4 is a bottom view of a preferred embodiment of the transfer switch having an easily removable door and hood.

Referring now to FIG. 4, a bottom view of a preferred embodiment of the transfer switch 100 of the present invention is shown. The door 112 is in the closed position. One or more openings 402 may be formed on the bottom side 400 of the main compartment to allow for placement of additional wiring connected to the transfer switch.

It should be evident to those skilled in the art that the present invention possesses features that are beneficial to those in the business of manufacturing and distributing commercial embodiments of said invention. In particular, it is likely that manufacturers of commercial embodiments of the invention will realize a costs savings when manufacturing and assembling the main compartment, door, and hood of the switch at the same time, rather than separately manufacturing each of the foregoing components. Further, costs associated with packaging and storing the switch will be reduced as it will no longer be necessary to separately package and store the main compartment separately from the a kit containing the door, hood, or other enclosure structures. Consumers of such commercial embodiments will also likely benefit from the features of the present invention as the aforementioned costs savings may be passed along to them in the way of lower prices for the products. The foregoing advantages are not found in the prior art and represent a substantial improvement over it.

Although the invention hereof has been described by way of a preferred embodiment, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

I claim:

1. An electrical hardware enclosure comprising:
   (a) a weatherproof door removably secured to a main compartment of said enclosure; and
   (b) a weatherproof hood removably secured to a top side of said main compartment;
   wherein said door and said hood are removably secured to said main compartment by removable fasteners, and
   wherein said top side of said main compartment is enclosed such that when said weatherproof hood and said weatherproof door are removed said main compartment can still function as a stand-alone electrical hardware enclosure.

2. The electrical hardware enclosure of claim 1 wherein said removable fasteners comprise one or more screws that are adapted for mating with one or more holes pre-drilled into said main compartment.

3. The electrical hardware enclosure of claim 2 wherein said one or more screws are fastened to said main compartment and one or more hinges attached to said door.

4. The electrical hardware enclosure of claim 3 wherein said door is configured to rotate about an axis of said one or more hinges until closed about a front side of said main compartment.

5. The electrical hardware enclosure of claim 4 wherein said hood is positioned on said top side such that an overhanging portion of said hood extends beyond a front side of said main compartment.

6. The electrical hardware enclosure of claim 5 wherein a top portion of said door, when closed, slides underneath said overhanging portion of said hood.

7. The electrical hardware enclosure of claim 6, further comprising a latch attached to said main compartment, said latch adapted to engage a protrusions attached to said main compartment.

8. The electrical hardware enclosure of claim 7, further comprising one or more holes formed on a surface thereof for the passage of one or more wires.

9. A transfer switch adapted for optionally mounting on the interior or exterior of a structure, comprising:
   (a) a main compartment for enclosing electrical hardware components, said main compartment having one or more holes formed thereon for receiving removable fasteners;
   (b) a weatherproof door removably attached to said main compartment by at least one of said removable fasteners; said door having at least one hinge attached to said door and to said main compartment, allowing said door to rotate about said hinge such that a front side of said main compartment is not visible when said door is in a closed position; and
   (c) a weatherproof hood removably attached to a top side of said main compartment by at least one of said removable fasteners; said hood being positioned on said top side such that a portion of said hood extends beyond said front side;
   wherein said door is capable of sliding freely along an axis of said hinge;
   wherein said door, when closed, is capable of sliding along said axis until a top portion of said door slides underneath said portion of said hood that extends beyond said front side;
   wherein said transfer switch, when sold to a user, is assembled such that said door and said hood are secured to said main compartment.

10. The transfer switch of claim 9 wherein said fasteners are screws.

11. The transfer switch of claim 9, further comprising a latch attached to said main compartment, said latch adapted to engage a protrusion attached to said main compartment.

12. The transfer switch of claim 11 wherein said door and said hood are attached prior to a sale of said transfer switch to a user.

13. An electrical hardware enclosure kit adapted for optionally mounting indoors or outdoors, comprising:
   (a) a compartment capable of use indoors without the addition of weatherproofing hardware;
   (b) a weatherproof door adapted for removable attachment to said compartment; and
   (c) a weatherproof hood, separate from a top side of said compartment, adapted for removable attachment to said top side such that when said door and said hood are attached and in a closed position said hood protrudes outward from said top side and extends over a top edge of said door.

14. The electrical hardware enclosure kit of claim 13 wherein said door comprises at least one hinge for attaching said door to said compartment such that when said door is attached to said compartment, said door can rotate about said at least one hinge such that a front side of said compartment is not visible when said door is in a closed position.

15. The electrical hardware enclosure kit of claim 14 wherein said door is capable of sliding freely along an axis of said at least one hinge for allowing said top edge of said door to slide underneath a lip on said hood.

16. The electrical hardware enclosure kit of claim 15 wherein said compartment further comprises a latch for securing said door in a closed position.

17. The electrical hardware enclosure kit of claim 13 wherein said door and said hood are secured to said compartment prior to sale to a user.

18. The electrical hardware enclosure kit of claim 13 wherein said door and said hood are not secured to said compartment prior to sale to a user.

19. The electrical hardware enclosure kit of claim 13 wherein said compartment comprises a transfer switch.

* * * * *